(12) United States Patent
Badger et al.

(10) Patent No.: US 11,989,750 B2
(45) Date of Patent: *May 21, 2024

(54) TECHNOLOGIES FOR ENHANCED PAYMENT TRANSACTIONS

(71) Applicant: Worldpay, LLC, Symmes Township, OH (US)

(72) Inventors: Brent Alan Badger, Powell, OH (US); Jacob Matthew Sterling, Creve Coeur, MO (US)

(73) Assignee: Worldpay, LLC, Symmes Township, OH (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/449,485

(22) Filed: Sep. 30, 2021

(65) Prior Publication Data
US 2022/0020048 A1 Jan. 20, 2022

Related U.S. Application Data

(63) Continuation of application No. 16/229,912, filed on Dec. 21, 2018, now Pat. No. 11,170,396, which is a (Continued)

(51) Int. Cl.
*G06Q 30/0207* (2023.01)
*G06Q 20/20* (2012.01)
*G06Q 20/24* (2012.01)
*G06Q 20/26* (2012.01)
*G06Q 20/38* (2012.01)
*G06Q 20/40* (2012.01)

(52) U.S. Cl.
CPC ......... *G06Q 30/0222* (2013.01); *G06Q 20/20* (2013.01); *G06Q 20/24* (2013.01);
(Continued)

(58) Field of Classification Search
None
See application file for complete search history.

(56) References Cited

U.S. PATENT DOCUMENTS 10,496,972 B1 * 12/2019 Anderson .............. G06Q 20/08
2008/0201224 A1 8/2008 Owens et al.
(Continued)

FOREIGN PATENT DOCUMENTS

WO 2013044093 A2 3/2013

*Primary Examiner* — Scott A Zare
(74) *Attorney, Agent, or Firm* — Bookoff McAndrews, PLLC

(57) ABSTRACT

Technologies for enhancing payment transactions include an acquirer computing system. The acquirer computing system receives a payment authorization request message for a payment transaction associated with a purchase event and event-specific data corresponding to the purchase event. An offer identification query is transmitted to a promotion management computing system via an out-of-band communications channel. Offer redemption instructions corresponding to a matched offer are received from the promotion management computing system via the out-of-band communications channel. Based on the redemption value of the matched offer, a net transaction amount for the purchase event is determined. The payment authorization request message is modified based on the determined net transaction amount. The modified payment authorization request message is transmitted to an issuer computing system via an in-band communications channel. A payment authorization response message is received from the issuer computing system via the in-band communications channel. Other embodiments are described and claimed.

18 Claims, 5 Drawing Sheets

Related U.S. Application Data continuation of application No. 14/991,309, filed on Jan. 8, 2016, now Pat. No. 10,198,740.

(60) Provisional application No. 62/129,255, filed on Mar. 6, 2015.

(52) U.S. Cl.
CPC ........... *G06Q 20/26* (2013.01); *G06Q 20/387* (2013.01); *G06Q 20/401* (2013.01); *G06Q 20/4012* (2013.01); *G06Q 20/405* (2013.01); *G06Q 20/409* (2013.01)

(56) References Cited

U.S. PATENT DOCUMENTS

| | | | |
|---|---|---|---|
| 2009/0106115 A1* | 4/2009 | James | G06Q 20/204 705/16 |
| 2009/0119194 A1 | 5/2009 | Chau et al. | |
| 2009/0171778 A1 | 7/2009 | Powell | |
| 2009/0216579 A1 | 8/2009 | Zen et al. | |
| 2010/0057554 A1* | 3/2010 | Lanford | G06Q 20/20 709/206 |
| 2011/0320262 A1 | 12/2011 | Symons et al. | |
| 2012/0166272 A1 | 6/2012 | Wiley et al. | |
| 2012/0221468 A1 | 8/2012 | Kumnick et al. | |
| 2013/0073361 A1* | 3/2013 | Silver | G06Q 30/06 705/14.17 |
| 2013/0080239 A1* | 3/2013 | Okerlund | G06Q 20/387 705/14.27 |
| 2013/0103578 A1 | 4/2013 | Mallean et al. | |
| 2013/0124263 A1 | 5/2013 | Amaro et al. | |
| 2013/0268333 A1* | 10/2013 | Ovick | G06Q 30/0226 705/14.17 |
| 2014/0054369 A1 | 2/2014 | Liberty et al. | |
| 2014/0114855 A1 | 4/2014 | Bajaj et al. | |
| 2015/0363752 A1 | 12/2015 | Kimberg et al. | |

* cited by examiner

TECHNOLOGIES FOR ENHANCED PAYMENT TRANSACTIONS

CROSS-REFERENCE TO RELATED APPLICATION(S)

This application is a continuation of and claims the benefit of priority to U.S. application Ser. No. 16/229,912, filed Dec. 21, 2018, which is a continuation of and claims the benefit of priority to U.S. application Ser. No. 14/991,309, filed Jan. 8, 2016, now U.S. Pat. No. 10,198,740, which claims the benefit of U.S. Provisional Application Ser. No. 62/129,255, filed on Mar. 6, 2015, entitled SYSTEMS AND METHODS FOR ENHANCED PAYMENT TRANSACTIONS, the entire disclosures of which are hereby incorporated by reference in their entireties.

TECHNICAL FIELD

Embodiments of the technologies described herein relate, in general, to the field of enhancing payment transactions through the leveraging of a private communications network, such as a PIN debit network. More particularly, the systems and methods relate to the field of facilitating promotions at a merchant's point of sale terminal, such as discounts, coupons, credit offers, financing options, and so forth, using communications out-of-band from an authorization request and associated transactional messaging.

BACKGROUND

Merchants can communicate with an acquirer processor in order to facilitate the merchant accepting a payment card as payment for goods or services. The electronic communications between the merchant and the acquirer can be restricted to a particular messaging specification or protocol.

SUMMARY

In an embodiment, the present disclosure is directed, in part, to a method for enhancing payment transactions. The method includes receiving, by an acquirer computing system and from a point of sale device of a merchant, a payment authorization request message for a payment transaction associated with a purchase event and event-specific data corresponding to the purchase event. The payment authorization request message includes a transaction amount corresponding to the purchase event. The method further includes transmitting, by the acquirer computing system, an offer identification query to a promotion management computing system via a first communications channel. The offer identification query includes the event-specific data corresponding to the purchase event. The method also includes receiving, by the acquirer computing system and in response to a matched offer determination, offer redemption instructions from the promotion management computing system via the first communications channel. The offer redemption instructions correspond to a matched offer and include a redemption value. Additionally, the method includes determining, by the acquirer computing system and in response to receipt of the offer redemption instructions, a net transaction amount based at least in part on the transaction amount corresponding to the purchase event and the redemption value of the matched offer. The method further includes modifying, by the acquirer computing system, the payment authorization request message to substitute the transaction amount with the determined net transaction amount. Additionally, the method includes transmitting, by the acquirer computing system, the modified payment authorization request message to an issuer computing system via a second communications channel. The issuer computing system is associated with a payment vehicle tendered for the payment transaction and the second communications channel is different from the first communications channel. The method also includes receiving, by the acquirer computing system via the second communications channel, a payment authorization response message from the issuer computing system as a function of the modified payment authorization request message.

In another embodiment, the present disclosure is directed, in part, to a system for enhanced payment transactions. The system includes an acquirer computing system having a processor executing instructions stored in memory. The instructions, when executed, cause the processor to receive, front a point of sale device of a merchant, a payment authorization request message for a payment transaction associated with a purchase event and event-specific data that corresponds to the purchase event. The payment authorization request message includes a transaction amount that corresponds to the purchase event. The instructions further cause the processor to transmit an offer identification query to a promotion management computing system via a first communications channel. The offer identification query includes the event-specific data that corresponds to the purchase event. The instructions also cause the processor to receive, in response to a matched offer determination, offer redemption instructions from the promotion management computing system via the first communications channel. The offer redemption instructions correspond to a matched offer and include a redemption value. Additionally, the instructions cause the processor to determine, in response to receipt of the offer redemption instructions, a net transaction amount based at least in pan on the transaction amount that corresponds to the purchase event and the redemption value of the matched offer. The instructions further cause the processor to modify the payment authorization request message to substitute the transaction amount with the determined net transaction amount. Additionally, the instructions cause the processor to transmit the modified payment authorization request message to an issuer computing system via a second communications channel. The issuer computing system is associated with a payment vehicle tendered for the payment transaction and the second communications channel is different from the first communications channel. The instructions also cause the processor to receive, via the second communications channel, a payment authorization response message from the issuer computing system as a function of the modified payment authorization request message.

In another embodiment, the present disclosure is directed, in part, to a method for enhancing payment transactions. The method includes receiving, by an acquirer computing system and from a point of sale device of a merchant, an offer identification query for a purchase event. The offer identification query includes event-specific data corresponding to the purchase event. The method further includes transmitting, by the acquirer computing system, the received offer identification query to a promotion management computing system via a first communications channel. Additionally, the method includes receiving, by the acquirer computing system and in response to a matched offer determination, offer redemption instructions from the promotion management computing system via the first communications channel. The offer redemption instructions correspond to a matched offer.

The method also includes receiving, by the acquirer computing system and in response to an unmatched offer determination, a notification message from the promotion management computing system via the first communications channel. The method further includes transmitting, by the acquirer computing system, the received offer redemption instructions or the a received notification message to the point of sale device. Additionally, the method includes receiving, by the acquirer computing system and from the point of sale device, a payment authorization request message for a payment transaction associated with the purchase event. The received payment authorization request message includes a net transaction amount corresponding to the purchase event when the received offer redemption instructions are transmitted to the point of sale device. Alternatively, the received payment authorization request message includes an undiscounted transaction amount corresponding to the purchase event when the received notification message is transmitted to the point of sale device. The method also includes transmitting, by the acquirer computing system, the payment authorization request message to an issuer computing system via a second communications channel. The issuer computing system is associated with a payment vehicle tendered for the payment transaction and the second communications channel is different from the first communications channel. The method further includes receiving, by the acquirer computing system via the second communications channel, a payment authorization response message from the issuer computing system as a function of the payment authorization request message.

In another embodiment, the present disclosure is directed, in part to a system for enhanced payment transactions. The system includes an acquirer computing system having a processor executing instructions stored in memory. The instructions, when executed, cause the processor to receive, from a point of sale device of a merchant, an offer identification query for a purchase event. The offer identification query includes event-specific data corresponding to the purchase event. The instructions further cause the processor to transmit the received offer identification query to a promotion management computing system via a first communications channel. Additionally, the instructions cause the processor to receive, in response to a matched offer determination, offer redemption instructions from the promotion management computing system via the first communications channel. The offer redemption instructions correspond to a matched offer. The instructions also cause the processor to receive, in response to an unmatched offer determination, a notification message from the promotion management computing system via the first communications channel. The instructions further cause the processor to transmit the received offer redemption instructions or the received notification message to the point of sale device. Additionally, the instructions cause the processor to receive, from the point of sale device, a payment authorization request message for a payment transaction associated with the purchase event. The received payment authorization request message includes a net transaction amount that corresponds to the purchase event when the received offer redemption instructions are transmitted to the point of sale device. Alternatively, the received payment authorization request message includes an undiscounted transaction amount that corresponds to the purchase event when the received notification message is transmitted to the point of sale device. The instructions also cause the processor to transmit the payment authorization request message to an issuer computing system via a second communications channel. The issuer computing system is associated with a payment vehicle tendered for the payment transaction and the second communications channel is different from the first communications channel. The instructions further cause the processor to receive, via the second communications channel, a payment authorization response message from the issuer computing system as a function of the payment authorization request message.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
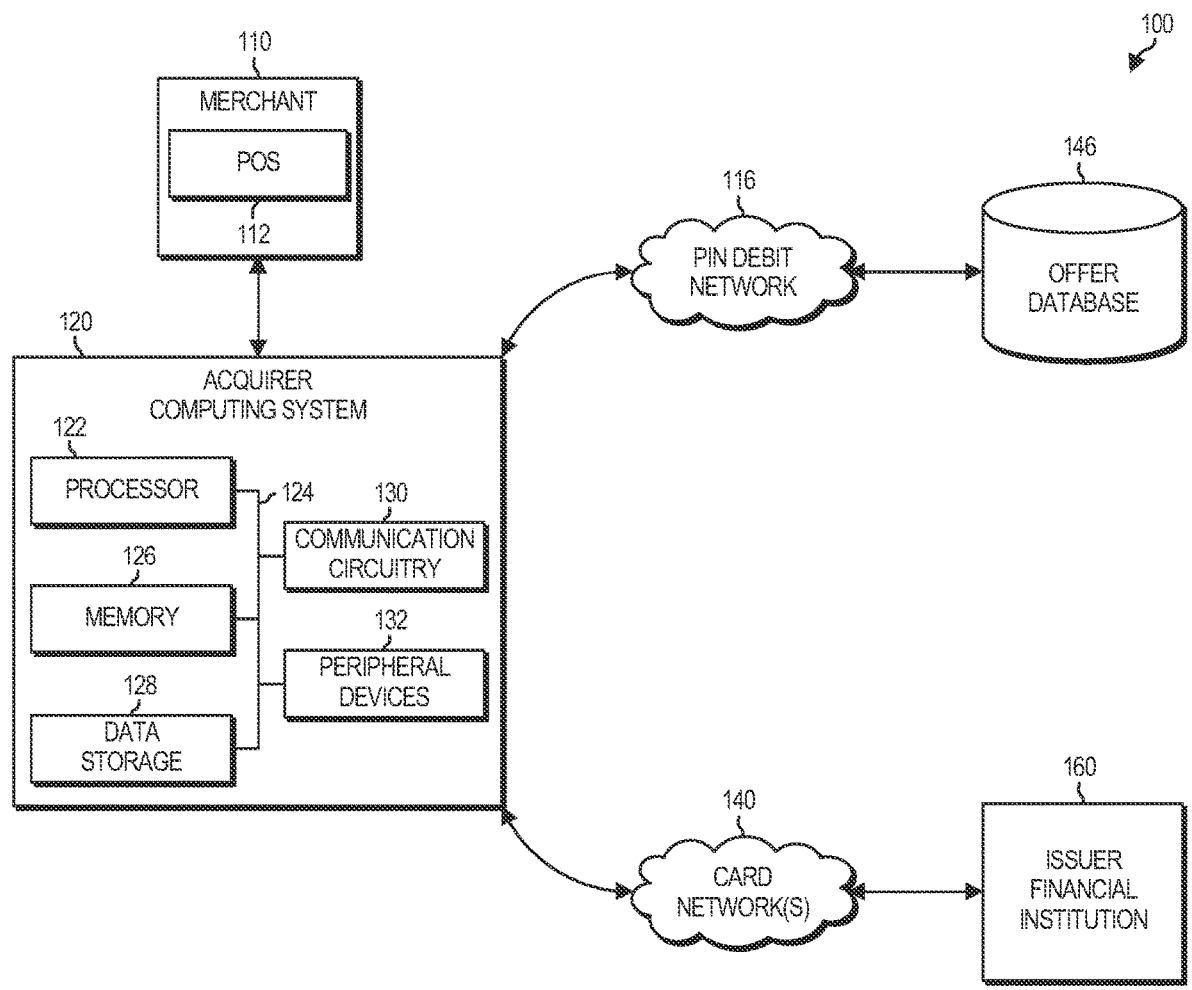
FIG. 1 is a simplified block diagram of at least one embodiment of a system for leveraging a PIN debit network as a standalone offer redemption network to provide enhanced payment processing.

Various non-limiting embodiments of the present disclosure will now be described to provide an overall understanding of the principles of the structure, function, and use of systems and methods disclosed herein. One or more examples of these non-limiting embodiments are illustrated in the selected examples disclosed and described in detail with reference made to the figures in the accompanying drawings. Those of ordinary skill in the art will understand that systems and methods specifically described herein and illustrated in the accompanying drawings are non-limiting embodiments. The features illustrated or described in connection with one non-limiting embodiment can be combined with the features of other non-limiting embodiments. Such modifications and variations are intended to be included within the scope of the present disclosure.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, chip-based payment cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, a "virtual" card (e.g., in the form of a display on a smart phone), or any other like financial transaction instrument. In any event, the payment vehicles described herein communicate account information (e.g., an account number or other account indicative information) during a purchase event and/or payment transaction.

As is known in the art, merchants typically communicate with an acquirer processor (sometimes called a merchant processor or a merchant acquirer) in order to facilitate the merchant accepting a payment card as payment for goods or services. The electronic communications between the merchant and the acquirer are generally restricted to a particular messaging specification or protocol, thereby limiting the opportunity to provide enhanced messaging using that communication stream. As such, there exists a need for alternative payment systems and methods that allow merchants, consumers, and/or other entities, such as card issuers, to enjoy enhanced payment transaction experiences, in accordance with the present disclosure, a PIN debit network or other type of private communications network can allow for additional messaging between the merchant and an offer database operated by an entity. As described in more detail below, the entity operating the offer database can be, for example, the merchant acquirer of the merchant or another party (e.g., a redemption platform operator, which can be another merchant acquirer, for example). In some embodiments, this additional messaging is facilitated through a PIN debit network. In accordance with the present disclosure, PIN debit networks and other private communications networks can be pre existing, closed loop communication channels connecting a point of sale (POS) device to a third party, such as an acquirer computing system, an issuer financial institution, a redemption platform operator, and any other entity. Conventional PIN-based transactions are routed through a PIN debit network instead of a card network operated by a card brand, such as VISA or MASTERCARD. In some configurations, the PIN debit network is a one-to-many network connecting a plurality of POS devices to a single acquirer computing system (or other computing device) or connecting a single POS device to multiple computing devices (e.g., acquirer computing system(s), issuer financial institution(s), redemption platform operator(s), etc.). Additionally, in some embodiments, the PIN debit network is a many-to-many network connecting a plurality of POS devices to multiple computing devices. In accordance with the present disclosure, these pre-existing communications channels can be configured to facilitate the enhanced messaging described herein. By utilizing pre-existing communications channels (such as a PIN debit network) integration efforts needed to implement the technologies described herein can be reduced.

In accordance with some embodiments, a PIN debit network (or other form of private network), provides a standalone redemption network that can facilitate real time offer redemption and application within the transaction authorization flow. Such functionality can be provided subsequent to the initiation of a purchase transaction at a POS device (e.g., a card "swipe") but prior to a transaction being routed to traditional card or payment networks for authorization. The technologies described herein can be built upon, for example, existing PIN debit network infrastructures and POS connectivity. In some embodiments, a payment transaction initiated by a POS device can be passed first to the PIN debit network and then to an offer redemption platform to check for the presence of an offer. Example types of offers can include, without limitation, discounts, promotions, credits, and/or coupons, or other types of stored benefits that can be applied to a transaction. The transaction can utilize the PIN debit network irrespective of whether the payment card used to initiate the transaction is itself affiliated with the PIN debit network. If an offer is present, instructions for applying the offer can be returned to the POS device via the PIN debit network. The offer can be applied to a payment transaction using any number of different processing techniques, such as a partial approval, coupon redemption, or a split tender transaction, for example. Subsequently, a payment authorization transaction can then be passed over the traditional payment or card networks net any discounts/offers that were applied.

Referring now to FIG. 1, in one embodiment, a system 100 for providing enhanced payment processing includes a merchant 110, a merchant point of sale (POS) device 112, an acquirer computing system 120, a PIN debit network 110, one or more payment card networks 140, an oiler database 146, and an issuer financial institution 160. As described in more detail below, the PIN debit network 116 can be leveraged as a standalone offer redemption network and/or an enhanced payment transaction processing network. In doing so, it should be appreciated that the PIN debit network 116 can be configured to capture, bundle, and communicate various types of data (e.g., stock keeping unit data, offer data, redemption data, transaction data, consumer data, loyalty data, balance data, etc.) between payment devices and systems that cannot otherwise be communicated with via traditional payment card networks 140 due to strict financial transaction messaging specifications (e.g., ISO 8583, etc.) and/or protocol requirements.

In an embodiment, the POS device 112 originates transaction messaging for a payment transaction corresponding to a purchase event. To do so, the POS device 112 can transmit a payment authorization request message for the payment transaction to the acquirer computing system 120. In some embodiments, the POS device 112 additionally communicates purchase event-specific data such as, for example, stock keeping unit (SKU) data associated with a purchased product or service, cardholder identification data associated with the payment vehicle tendered in the payment transaction corresponding to the purchase event, an account identifier associated with the payment vehicle tendered in the payment transaction corresponding to the purchase event, a bank identification number (BIN) associated with the payment vehicle tendered in the payment transaction corresponding to the purchase event, or any other type of data describing or associated with the purchase event. The POS device 112 can also communicate merchant-related information, such as a merchant identification number (MID) and a merchant category code (MCC). Based at least in part on, or otherwise as function of, the payment authorization request message and/or the additional purchase event-specific data received from the POS device 112, the acquirer computing system 120 can transmit an offer identification query message to the offer database 146, which can be configured to store and manage one or more offers available for redemption. As discussed, due to strict financial transaction messaging specifications and/or protocol requirements, traditional card networks 140 are capable of communicating only very specific types of data (e.g., payment authorization request messages, payment authorization response messages, etc.) arranged in a particular format. As such, the acquirer computing system 120 transmits the offer identification query message and any additional event-specific data to the offer database 140 through the PIN debit network 116. Beneficially, the format of the offer identification query message sent through the PIN debit network 116 can be more flexible than compared to the format of the messaging sent through the traditional card networks 140.

In response to receiving the offer identification query message, the offer database 146 determines whether a matching offer exists. In embodiments in which the offer database 146 determines that a matching offer exists, the offer database 146 can transmit offer redemption instructions for a message including the offer redemption instructions) to the acquirer computing system 120 via the PIN debit network 116. In embodiments in which the offer database 146 determines that a matching offer does not exist, the offer database 146 can transmit a notification message to the acquirer computing system 120 indicating that no matching offer exists. In such embodiments, the offer database 146 transmits the notification message to the acquirer computing system 120 via the PLN debit network 116.

After receiving the offer redemption instructions or the notification message from the offer database 146, the acquirer computing system 120 transmits a payment authorization request message to the issuer financial institution 160 via one or more of the card networks 140. In some embodiments, such payment authorization request message can be substantially similar to the payment authorization request message received from the POS device 112. In other embodiments, the payment authorization request message transmitted by the acquirer computing system 120 can be a modified version of the payment authorization request message received from the POS device 112 or a new version of the payment authorization request message altogether. In embodiments in which offer redemption instructions are received from the offer database 146, the acquirer computing system 120 can determine a net transaction amount for the purchase event based at least in part on, of otherwise as a function of, the offer redemption instructions. In such cases, the payment authorization request message transmitted by the acquirer computing system 120 via the card network(s) 140 can reflect the net transaction amount instead of the original transaction amount received from the POS device 112. In embodiments in which a notification message is instead received from the offer database 146, the payment authorization request message transmitted by the acquirer computing system 120 can reflect the original transaction amount received from the POS device 112. In either case, the issuer financial institution 160 processes the payment authorization request message and transmits a payment authorization response message to the acquirer computing system 120 and/or the POS device 112 via the card network(s) 140 according to traditional payment card processing techniques. It should be appreciated that although the payment authorization request and response messages are transmitted and processed via the card networks 140 in the illustrative embodiment, all or a portion of the payment authorization request and response messages can instead be transmitted and/or processed via the PIN debit network 116 (or another communications network) in other embodiments.

In other embodiments, the POS device 112 originates payment transaction messaging and offer redemption messaging corresponding to a purchase event. In such embodiments, the POS device 112 transmits an offer identification query message to the offer database 146 via the PIN debit network 116. In embodiments in which the POS device 112 is not in direct communication with the PIN debit network 116, the POS device 112 can first transmit the offer identification query message to the acquirer computing system 120, which can then forward the offer identification query message to the offer database 146 via the PIN debit network 116. In response to receiving the offer identification query message, the offer database 146 determines whether a matching offer exists and transmits offer redemption instructions or a notification message to the POS device 112 via the PIN debit network 116. In embodiments in which the POS device 112 is not in direct communication with the PIN debit network 116, the offer database 146 can first transmit the offer redemption instructions or notification message to the acquirer computing system 120 via the PIN debit network 116. The acquirer computing system 120 can then forward the offer redemption instructions or notification message to the POS device 112.

After receiving the offer redemption instructions or the notification message from the offer database 146, the POS device 112 transmits a payment authorization request message to the acquirer computing system 120 to be transmitted the issuer financial institution 160 via one or more of the card networks 140. In embodiments in which offer redemption instructions are received from the offer database 146, the POS device 112 can determine a net transaction amount for the purchase event based at least in part on, or otherwise as a function of, the offer redemption instructions. In such cases, the payment authorization request transmitted by POS device 112 can reflect the net transaction amount instead of the original transaction amount received from the POS device 112. In embodiments in which a notification message is instead received from the offer database 146, the payment authorization request message transmitted by POS device 112 can reflect the original transaction amount received from the POS device 112. In either case, the issuer financial institution 160 processes the payment authorization request message and transmits a payment authorization response message to the acquirer computing system 120 and/or the POS device 112 via the card network(s) 140 according to traditional payment card processing techniques. In some embodiments, the offer database 146 can transmit an offer redemption notification message to the POS device 112 and/or the merchant 110 via the PIN debit network 116. In response to the offer redemption notification message, the POS device 112 and/or the merchant 110 can provide an indication of the redemption on a receipt, for example. In such embodiments, the offer database 146 can also notify the issuer financial institution 160 and/or a cardholder/consumer of the redemption event. Additionally, in some embodiments, settlement of the offer with the offer originator (e.g., a brand, a consumer packaged goods company, etc.) can be facilitated via the PIN debit network 116.

The acquirer computing system 120 can be embodied as a computing device or server capable of processing, communicating, storing, maintaining, and transferring data. For example, the acquirer computing system 120 can be embodied as a server, a microcomputer, a minicomputer, a mainframe, a desktop computer, a laptop computer, a mobile computing device, a handheld computer, a smart phone, a tablet computer, a personal digital assistant, a telephony device, a custom chip, an embedded processing device, or other computing device and/or suitable programmable device. In some embodiments, the acquirer computing system 120 can be embodied as a computing device integrated with other systems or subsystems. In the illustrative embodiment of FIG. 1, the acquirer computing system 120 includes a processor 122, a system bus 124, a memory 126, a data storage 128, communication circuitry 130, and one or more peripheral devices 132. Of course, the acquirer computing system 120 can include other or additional components, such as those commonly found in a server and/or computer (e.g., various input/output devices), in other embodiments. Additionally, in some embodiments, one or more of the illustrative components can be incorporated in, or otherwise from a portion of, another component. For example, the memory 126, or portions thereof, can be incorporated in the processor 122 in some embodiments. Furthermore, it should be appreciated that the acquirer computing system 120 can include other components, sub-components, and devices commonly found in a computer and/or computing device, which are not illustrated in FIG. 1 for clarity of the description.

The processor 122 can be embodied as any type of processor capable of performing the functions described herein. For example, the processor 122 can be embodied as a single or multi-core processor, a digital signal processor, microcontroller, a general purpose central processing unit (CPU), a reduced instruction set computer (RISC) processor, a processor having a pipeline, a complex instruction set computer (RISC) processor, an application specific integrated circuit (ASIC), a programmable logic device (PLD), a field programmable gate array (FPGA), or other processor or processing/controlling circuit or controller.

In various configurations, the acquirer computing system 120 includes a system bus 124 for interconnecting the various components of the acquirer computing system 120. The system bus 124 can be embodied as, or otherwise include, memory controller hubs, input/output control hubs, firmware devices, communication links (e.g. point-to-point links, bus links, wires, cables, light guides, printed circuit board traces, etc.) and/or other components and subsystems to facilitate the input/output operations with the processor 122, the memory 126, and other components of the acquirer computing system 120. In some embodiments, the acquirer computing system 120 can be integrated into one or more chips such as a programmable logic device or an application specific integrated circuit (ASIC). In such embodiments, the system bus 124 can form a portion of a system-on-a-chip (SoC) and be incorporated, along with the processor 122, the memory 126, and other components of the acquirer computing system 120, on a single integrated circuit chip.

The memory 126 can be embodied as any type of volatile or non-volatile memory or data storage capable of performing the functions described herein. For example, the memory 126 can be embodied as read only memory (ROM), random access memory (RAM), cache memory associated with the processor 122, or other memories such as dynamic RAM (DRAM), static RAM (SRAM), programmable ROM (PROM), electrically erasable PROM (EEPROM), flash memory, a removable memory card or disk, a solid state drive, and so forth in operation, the memory 126 can store various data and software used during operation of the acquirer computing system 120 such as operating systems, applications, programs, libraries, and drivers.

The data storage 128 can be embodied as any type of device or devices configured for short-term or long-term storage of data such as, for example, memory devices and circuits, memory cards, hard disk drives, solid-state drives, or other data storage devices. For example, in some embodiments, the data storage 128 includes storage media such as a storage device that can be configured to have multiple modules, such as magnetic disk drives, floppy drives, tape drives, hard drives, optical drives and media, magneto-optical drives and media, Compact Disc (CD) drives, Compact Disc Read Only Memory (CD-ROM), Compact Disc Recordable (CD-R), Compact Disc Rewriteable (CD-RW), a suitable type of Digital Versatile Disc (DVD) or Blu-Ray disc, and so forth. Storage media such as flash drives, solid state hard drives, redundant array of individual disks (RAID), virtual drives, networked drives and other memory means including storage media on the processor 122, or the memory 126 are also contemplated as storage devices. It should be appreciated that such memory can be internal or external with respect to operation of the disclosed embodiments. It should also be appreciated that certain portions of the processes described herein can be performed using instructions stored on a computer-readable medium or media that direct or otherwise instruct a computer system to perform the process steps. Non-transitory computer-readable media, as used herein, comprises all computer-readable media except for transitory, propagating signals.

The communication circuitry 130 of the acquirer computing system 120 can be embodied as any type of communication circuit, device, interface, or collection thereof, capable of enabling communications between the acquirer computing system 120 (or other computing devices associated with an acquirer) and the POS device 112 (or other computing devices of the merchant 110), the PIN debit network 116 (or computing devices associated therewith), the card network(s) 140 (or computing devices associated therewith), the offer database 146 (or computing devices associated therewith), the issuer financial institution 160 (or computing devices associated therewith), and/or any other computing device communicatively coupled thereto. For example, the communication circuitry 130 can be embodied as one or more network interface controllers (NICs), in some embodiments. The communication circuitry 130 can be configured to use any one or more communication technologies (e.g., wireless or wired communications) and associated protocols (e.g., Ethernet, Wi-Fi®, WiMAX, etc.) to effect such communication.

In some embodiments, the acquirer computing system 120 (or other computing devices associated with an acquirer), the POS device 112 (or other computing devices of the merchant 110), the PIN debit network 116 (or computing devices associated therewith), the card network(s) 140 (or computing devices associated therewith), the offer database 146 (or computing devices associated therewith), the issuer financial institution 160 (or computing devices associated therewith), and/or any other computing devices of the system 100, can communicate with each other over one or more networks. The network(s) can be embodied as any number of various wired and/or wireless communication networks. For example, the network(s) can be embodied as or otherwise include a local area network (LAN), a wide area network (WAN), a cellular network, or a publicly-accessible, global network such as the Internet. Additionally, the network(s) can include any number of additional devices to facilitate communication between the computing devices of the system 100.

Additionally, in some embodiments, the acquirer computing system 120 can further include one or more peripheral devices 132. Such peripheral devices 132 can include any type of peripheral device commonly found in a computing device such as additional data storage, speakers, a hardware keyboard, a keypad, a gesture or graphical input device, a motion input device, a touchscreen interface, one or more displays, an audio unit, a voice recognition unit, a vibratory device, a computer mouse, a peripheral communication device, and any other suitable user interface, input/output device, and/or other peripheral device.

In the illustrative embodiments, the acquirer computing system 120 communicates with the offer database 146 (or computing devices associated therewith) over the PIN debit network 116. The PIN debit network 116 is generally a type of a private communication network that governs and processes purchase and payment transactions where the consumer is validated through the combination of presentment of a plastic card and entry of a PIN or signature. Typical debit payment brand networks include STAR, PULSE, MAESTRO USA, JEANIE and INTERLINK. The PIN debit network 116 can be an established or pre-existing communication channel between the POS device 112 and a third party, such as, for example, the acquirer computing system 120 and/or a PIN debit authorization entity. As described herein, the PIN debit network 116 can be used as a private communication network connecting a merchant 110 to a provider of offers or other enhanced services, such as coupons, credit offers, or financing offers. Unlike traditional payment or card networks 140 that often have regimented specifications and protocols, the PIN debit network 116 can offer flexibility with regard to the messaging format and content, thereby allowing a merchant 110, issuer financial institution 160, or other entity to offer enhanced features to a variety of stakeholders. In that way, the PIN debit network 116 is embodied as a communications network out-of-band from the card network(s) 140.

Additionally, in the illustrative embodiments, the acquirer computing system 120 communicates with the issuer financial institution 160 (or computing devices associated therewith) over the one or more payment or card networks 140. The card network(s) 140 can be, for example, a network of a credit card association affiliated with a payment vehicle or payment card. Non-limiting examples of credit card associations include VISA, MASTERCARD, DISCOVER, and AMERICAN EXPRESS. In some embodiments, the card network(s) 140 receive a payment authorization request message from the acquirer computing system 120 for a payment transaction. The card network(s) 140 can provide the payment authorization request message to a payment processing server of an issuer processor (not shown), which in turn can provide the payment authorization request message to the issuer financial institution 160. The issuer financial institution 160 can then associate the payment vehicle or payment card used with an account held by the issuer financial institution. Thereafter, the issuer financial institution 160 can transmit a payment authorization response message to the card network(s) 140 via the issuer processor. In response to receiving the payment authorization response message, the card network(s) 140 can transmit the payment authorization response message to the acquirer computing system 120. In some embodiments, the card network(s) 140 include a payment gateway (not shown) configured to facilitate the acquirer computing system 120 or, more generally, merchants 110 in processing payment and purchase transactions.

The merchant 110 can be embodied as any type of retailer, service provider, vendor, or any other type of entity that sells, or offers to sell, a good and/or service. To facilitate sales and accounting activities, the merchant 110 can include various communication networks and computing devices (e.g., sales terminals, back-end servers, payment entry devices, card readers, mobile devices, etc.). For example, as illustratively shown, the merchant 110 includes the POS device 112. Of course, the merchant 110 can include other computing devices or architectures commonly used by retail merchants, which are not illustrated in FIG. 1 for clarity of the description. In some embodiments such as the one shown in FIG. 1, the merchant 110 (or computing devices thereof) can be in networked communication with the acquirer computing system 120 and use the payment processing services of the acquirer computing system 120. Payment processing services can include receiving and responding to authorization requests as well as facilitating the settlement of funds associated with payment card-based transactions occurring at the merchant 110.

The POS device 112 can be embodied as any type of computing or payment device capable of performing the functions described herein. As such, the POS device 112 can include devices and structures commonly found in computing devices such as processors, memory devices, communication circuitry, and data storages, which are not shown in FIG. 1 for clarity of the description. For example, the POS device 112 can include a card reader or a PIN pad configured to facilitate receipt of a payment card for a purchase or payment transaction (e.g., a credit or debit transaction). The POS device 112 can be configured to perform certain business-related functions, such as, without limitation, sales tabulation, inventory management, scheduling, accounting processes, payroll, and the like. Additionally, in some embodiments, the POS device 112 can include payment hardware and functionality configured for receiving traditional payment cards containing magnetic stripes (e.g., magstripes, swipe cards, etc.). The POS device 112 can also include payment hardware and functionality configured for receiving payment cards via Near Field Communication (NFC) technologies, BLUETOOTH communication technologies, and other contactless and/or short-range wireless communication technologies. Additionally or alternatively, in some embodiments, the POS device 112 can include integrated circuit payment hardware and functionality configured for receiving a EUROPAY, MASTERCARD. AND VISA (EMV) payment card or other smartcard or chip-based card. The POS device 112 can include any other type of payment hardware and functionality for receiving a payment card or vehicle. As used herein, the term POS device 112 is used broadly to include POS systems at brick-and-mortar locations and "virtual" POS systems and devices that can be associated with an online retailer, "in-app" purchases, or other types of card not present (CNP) transactions.

The POS device 112 can facilitate the transmission of transaction-related information to the acquirer computing system 120, as is known in the art. The transaction-related information can comprise an authorization request as well as other types of identifying indicia. The identifying indicia can vary based on the POS device 112, the type of merchant 110, and the type of transaction, but example types of identifying indicia can include any of the following, a merchant identification number (MID) identifier; a loyalty program identifier, a bank identification number (BIN) or other bank identifier associated with the payment vehicle tendered in the payment transaction corresponding to the purchase event, an account identifier associated with the payment vehicle tendered in the payment transaction corresponding to the purchase event, a merchant category code (MCC) identifier, a media access control (MAC) identifier; an Internet Protocol (IP) identifier, a geographic identifier, a payment type identifier, a consumer identifier (e.g., a consumer name, a consumer address, a consumer phone number, a consumer email address, a unique consumer number, etc.) associated with a consumer engaged in the purchase event, and/or a cardholder identifier (e.g., a cardholder name, a cardholder address, a cardholder phone number, a cardholder email address, a unique cardholder number, etc.) associated with the payment vehicle tendered in the payment transaction corresponding to the purchase event. The POS device 112 can also facilitate the transmission of purchase event-specific or purchase event-related information to the offer database 146 and/or a redemption platform operator (e.g., the promotion management computing system 250 illustratively shown in FIG. 2). The purchase event-specific information can include, for example, stock keeping unit (SKU) data associated with a purchased product or service or any other type of data describing or associated with the purchase event. As described herein, the purchase event-specific information can be transmitted to other entities of the system 100 via the PIN debit network 116.

The offer database 146 can be embodied as any type of computing device capable of performing the functions described herein. As such, the offer database 146 can include devices and structures commonly found in computing devices such as processors, memory devices, communication circuitry, and data storages, which are not shown in FIG. 1 for clarity of the description. The offer database 146 can be hosted by any suitable entity, such as a merchant acquirer (e.g., the acquirer computing system 120) or a redemption platform operator (e.g., the promotion management computing system 250 illustratively shown in FIG. 2). In the illustrative embodiment, the offer database 146 is configured to store and mange one or more offers available for redemption. Each of the offers can be associated with one or more redemption conditions or parameters. In the illustrative embodiment, the offer database 146 (or a computing device associated therewith) can be accessed by the acquirer computing system 120, the POS device 112, or any other computing device of the system 100 via the PIN debit network 116. As discussed herein, the offer database 146 or an associated computing system (e.g., the promotion management computing system 250 shown in FIG. 2) can be configured to process incoming offer identification messages and generate and transmit offer redemption instructions and/or notifications messages in response. Such offer redemption instructions and/or notification messages can be transmitted to the acquirer computing system 120 and/or the POS device 112 via the PIN debit network 116.

In some embodiments, the acquirer computing system 120, the POS device 112 (or other computing devices of the merchant 110), the PIN debit network 116 (or computing devices thereof), the card network(s) 140 (or computing devices thereof), the offer database 146 (or computing devices associated therewith), and the issuer financial institution 160 (or computing devices thereof) can each establish an environment during operation. Each environment can include various modules, components, sub-components, and devices commonly found in computing devices, which are not illustrated in the figures for clarity of the description. The various modules, components, sub-components, and devices of each environment, can be embodied as hardware, firmware, software, or a combination thereof. For example, one or more of the modules, components, sub-components, and devices of each environment can be embodied as a processor and/or a controller configured to provide the functionality described herein.

Figure 2:
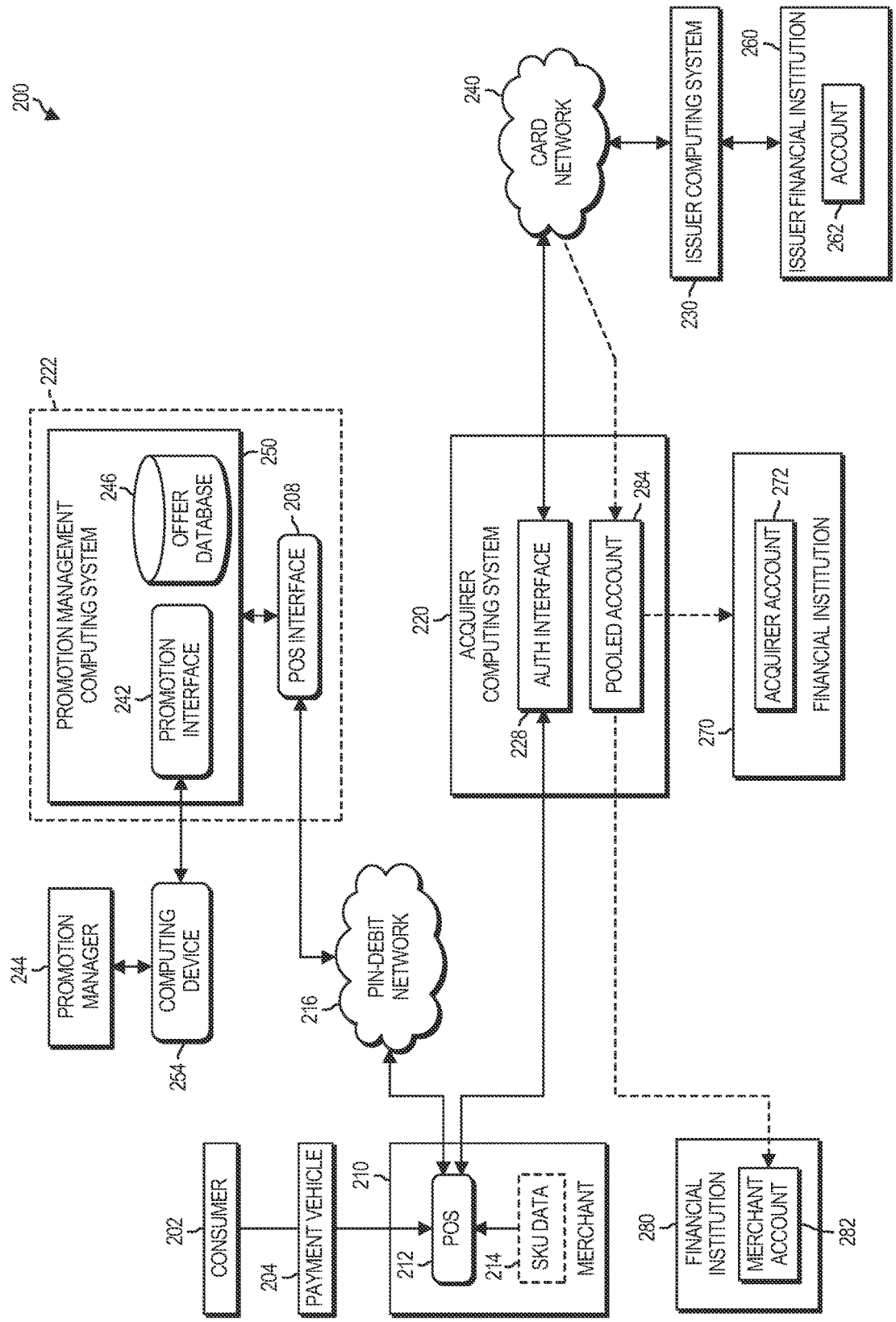
FIG. 2 is a simplified block diagram of a system for providing enhanced payment transaction functionality in accordance with various non-limiting embodiments.

Referring now to FIG. 2, in an embodiment, a system 200 for providing enhanced payment processing includes a merchant 210, a merchant point of sale (POS) device 212, an acquirer computing system 220, a PIN debit network 216, one or more payment card networks 240, an offer database 246, and an issuer financial institution 260. The system 200 can be embodied as an alternative arrangement to the enhanced payment system 100 illustratively shown in FIG. 1. As such, the merchant 210, merchant POS device 212, acquirer computing system 220, PIN debit network 216, payment card network(s) 240, offer database 246, and issuer financial institution 260 of the system 200 of FIG. 2 can be functionally or architecturally similar to, or the same as, in many respects to the merchant 110, merchant point of sale (POS) device 112, acquirer computing system 120, PIN debit network 116, payment card network(s) 140, offer database 146, and issuer financial institution 160 of the system 100 of FIG. 1. Additionally, as illustratively shown, the system 200 also includes a consumer 202, a payment vehicle 204, a financial institution 270, a financial institution 280, an issuer computing system 230, a promotion manager 244, a computing device 254, and a promotion management computing system 250.

In embodiments such as the one illustratively shown in FIG. 2, the promotion management computing system 250 is provided by an entity 222 separate from other entities of the system 200 and includes the offer database 246. In such embodiments, the separate entity 222 can be in communication with the POS device 212 through the PIN debit network 216 (e.g., private communications network) or similar communication "rails" to authorize PIN-based transactions. Such communication rails, which are typically used for PIN debit authorization messaging, can be utilized in accordance with the present disclosure to provide enhanced payment processing (e.g., offer redemption messaging additional transaction messaging, etc.) to the consumer 202. It should be appreciated that, in other embodiments, the promotion management computing system 250 can be provided by, or included within, the acquirer computing system 220, the issuer computing system 230, the issuer financial institution 260, a promotion redemption platform provider, or any other type of entity or computing device of the system 200.

The consumer 202, sometimes referred to as a cardholder, bank cardholder, or card member, can provide information from a payment vehicle 204 to the POS device 212 to initiate a payment transaction with the merchant 210. The payment transaction can correspond to a purchase event. As discussed, the payment vehicle 204 can be embodied as any type of physical or virtual payment vehicle having account information (e.g., an account number or other account indicative information) associated therewith.

The promotion management computing system 250 can be embodied as any type of computing device capable of performing the functions described herein. As such, the promotion management computing system 250 can include devices and structures commonly found in computing devices such as processors, memory devices, communication circuitry, and data storages, which are not shown in FIG. 2 for clarity of the description. While the promotion management computing system 250 is schematically depicted as being separate from other devices and entities of the system 200, this disclosure is not so limited. For instance, as described in more detail below (see FIGS. 4 and 5), the promotion management computing system 250 can be included in, or form part of, the issuer financial institution 260 (or a computing device thereof).

In some embodiments, the promotion management computing system 250 can provide a promotion interface 242 that is accessible by the promotion manager 244 through the computing device 254. The promotion interface 242 can be communicatively coupled to or interfaced with the offer database 246. The particular implementation of the promotion interface 242 can vary, but in some example embodiments, the promotion interface 242 is a webpage that allows a promotion manager 244 to input promotion parameters, review previously created promotions, select predesigned promotions, view existing promotions, and so forth (each of which can sometimes referred to as "offers," "discounts,"

"deals," "programs," etc.). The promotion manager 244 can provide or otherwise identify one or more promotions that can be applied to various transactions (e.g., purchase events, payment transactions, etc.). In some embodiments, the promotion interface 242 is provided by a specialized application that is executed on the computing device 254.

The promotion manager 244 can be associated with, for example, the merchant 210, the issuer financial institution 260, or any other third party, such as a marketing entity. As described in more detail below, the parameters and type of promotion can vary, but in some examples the promotion includes a segment definition that defines the customer base to which the promotion is applicable. In some embodiments, the promotion can be linked to a particular payment vehicle 204 of a cardholder or consumer 202 (e.g., based on account information) or the promotion can be more broadly linked to the consumer 202 and apply across a variety of payment vehicles 204 associated with the consumer 202. The promotion can be linked to a particular type of payment vehicle 204 or linked to certain usage parameters of the payment vehicle 204. In some embodiments, the promotion can be based on SKU data 214 that is received by the POS device 212 and provided to the promotion management computing system 250 through the PIN debit network 216, as described in more detail below. Using the SKU data 214 as a promotion parameter, a wide array of promotions can be offered by merchants, manufacturers, marketers, card issuers, and so forth. For example, the purchase of certain products or a combination of products can automatically unlock certain promotions for the consumer 202. Thus, a particular offer can be transaction-based and/or product-based.

In accordance with various implementations, the promotion manager 244 can initiate a marketing campaign by setting up an offer through interactions with the promotion management computing system 250 using the promotion interface 242, or directly through a customized campaign build. Once a marketing campaign is finalized, the campaign can be submitted into the promotion management computing system 250 to enable execution. Using the promotion interface 242, the promotion manager 244 can define the offer, set the parameters and rules, and assign the target segments of consumers 202 to receive the offer. Preset offer types and rules can be made available to the promotion manager 244, which can be subject to the approval of the issuer financial institution 260 before the campaign is activated. Example parameters include the offer type, publication and expiration dates, and the marketing media for disseminating the offer. The offer type can be, for example, a prepaid offer, a percentage off discount, a dollar discount, among other offer types. The marketing media can include the offer messaging and promotional copy; for example, the descriptive language that accompanies the offer itself. A pre-set copy can be provided from a library and can be sorted and displayed by merchant category. The pre-set copy can be customized, and can be subject to the approval of the issuer financial institution 260, or other entity.

The target segments of consumers that are to receive the offer can be pre-defined. Example pre-defined segments can include new consumers, existing consumers 202, consumers 202 who have shopped at the merchant 210 previously within a configurable period of time (e.g., within the last six months, or within a configurable window of time), consumers 202 who have shopped within a geographic radius (e.g., within a derived ZIP of their transaction history), segments based on past transaction history (e.g., consumers 202 who have made a purchase within a configurable category within a configurable period of time), segments based on advanced segmentation rules (e.g., best consumers, inactive consumers, consumers categorized as "soon to attrite", etc.), among other segments.

The promotion management computing system 250 can restrict the visibility of the promotion manager 244 to only the aggregate segment definition and a total count of consumers within the segment definition. Further, additional segment definition rules and controls can be applied to retain personally identifiable information (PII) and anonymity of the consumers, and prevent direct or indirect visibility by the promotion manager 244 of restricted segments characteristics. In a configuration, promotion management computing system 250 can inhibit the identification of consumers 202 in a particular segment.

The promotion management computing system 250 can be configured to facilitate use by national or regional merchants 210 that have existing customer relationship management systems or CRM systems, loyalty databases, or existing segmentation models. The campaign definition can permit receipt of merchant data via a customized campaign into the promotion management computing system 250. The merchant data can be segmented from the issuer financial institution 260 such that neither can see nor manipulate the other's data directly. In some cases, the segmentation rules can be overlaid with the issuer financial institution data or other partner data to enable more customized segmentation and targeting with the portfolio of the issuer financial institution 260. Merchant visibility can be restricted to aggregate segment definitions as described herein, and can be subject to the same controls that prevent direct and indirect visibility into restricted data characteristics. Once the marketing campaign is submitted into the promotion management computing system 250, in some embodiments, it can be queued for approval by the issuer financial institution 260 or other approving entity.

Once the marketing campaign is approved or otherwise available for use, the marketing campaign (e.g., offers) can be made available to other processes of the promotion management computing system 250 for publication and redemption. For example, others or other marketing campaign data can be stored or otherwise made available in the offer database 246. To improve response times and maintain required service levels, summary level campaign data, and other marketing campaign data, can be provided to the acquirer computing system 220 in an offer cache (not shown). The offers of the marketing campaign, including the offer messaging and promotional copy, can be published to consumers 202 using a suitable communications channel. For example, suitable communications channels can include messages sent through an online portal such as messages sent to the accounts of the consumers 202 on the website of the issuer financial institution 260, email messages sent to email accounts of the consumers 202, short message service (SMS) messages sent to mobile accounts of the consumers 202, messages maintained in a web log, social media messages, audible phone or voicemail messages, and/or any other suitable communications channel known, in development, or yet to be invented. In some embodiments, the consumers 202 can be required to accept an offer in order to link the offer to their payment vehicle 204 and qualify for the promotion. Such acceptance can be provided using any suitable technique, such as by activating or selecting a particular graphical element on a website, replying to a SMS message, or otherwise electronically communicating an acceptance of the offer.

After an offer has been made available in the offer database 246, the offer can be made available to consumers 202 when they use their payment vehicle 204 at the POS device 212 of the merchant 210. For example, when a payment vehicle 204 linked to an offer is swiped, or otherwise entered, at the POS device 212, the POS device 212 can be configured to transmit an offer identification query message to the promotion management computing system 250 over the PIN debit network 216. This transmission can occur prior to the POS device 212 submitting an authorization request message to the acquirer computing system 220. The transmitted offer identification query message can include various types of information specific or related to the purchase event. For example, the purchase event-specific information can include stock keeping unit (SKU) data associated with a purchased product or service, cardholder identification data associated with the payment vehicle 204 tendered in the payment transaction corresponding to the purchase event, an account identifier associated with the payment vehicle 204 tendered in the payment transaction corresponding to the purchase event, a bank identification number (BIN) associated with the payment vehicle 204 tendered in the payment transaction corresponding to the purchase event, or any other type of data describing or associated with the purchase event or associated payment transaction. The particular scope of this information can generally be broader, and the type of information can be more flexible, than the conventional payment transaction information sent between the POS device 212 and an authentication interface 228 of the acquirer computing system 220.

The promotion management computing system 250 can determine whether an offer is applicable based on the offer identification query message and the event-specific information included therein. To do so, in some embodiments, the promotion management computing system 250 can, for example, compare a BIN associated with the issuer financial institution 260 and/or the merchant ID (MID) associated with the merchant 210 to determine whether there is a matching offer. In such embodiments, if the promotion management computing system 250 determines that a matching offer exists based on the BIN and/or MID, any additional event-specific information included with the offer identification query message can be compared to one or more rules corresponding to the matching offer to determine whether the purchase event qualifies for the offer. It should be appreciated that any other technique for matching an offer identification query message to an offer can be used.

After the promotion management computing system 250 has determined whether a matching offer exists, the promotion management computing system 250 can provide return messaging to the POS device 212 through the PIN debit network 216. In the illustrative embodiment, a POS interface 208 can be configured to facilitate such return messaging through the PIN debit network 216. For example, in some embodiments, the POS interface 208 can transmit offer redemption instructions to the POS device 212 via the PIN debit network 216 in response to a determination that a matching offer exists. The offer redemption instructions can be based on the terms of the matching offer and can cause the POS device 212 to augment and/or modify a payment authorization request message prior to transmission of the request to the acquirer computing system 220. For example, in some embodiments, the offer redemption instructions include a redemption value of the matching offer. In such embodiments, the POS device 212 can reduce the transaction amount included in the payment authorization request message based on the redemption value of the matching offer prior to transmission of the request to the acquirer computing system 220. In another example, the POS interface 208 can transmit a notification message to the POS device 212 via the PIN debit network 216 in response to a determination that no matching offer exists. Receipt of the notification message can cause the POS device 212 to transmit a payment authorization request to the acquirer computing system 220 without augmentation and/or modification.

Upon receipt of either the payment authorization request message or the augmented payment authorization request message from the POS device 212, the acquirer computing system 220 transmits the payment authorization request message through the card networks) 240 to an issuer computing system 230 associated with the issuer financial institution 260 using conventional messaging. Ultimately, the issuer computing system 230 can respond to the payment authorization request message with a payment authorization response message indicative of an approval, a denial, or other suitable type of response. The payment authorization response message can be transmitted by the issuer computing system 230 to the acquirer computing system 220 via the card network(s) 240 using conventional messaging.

Subsequent to a successful payment transaction at the merchant 220, a settlement event can eventually occur that generally transfers funds from the account 262 that is linked to the payment vehicle 204 to at least an account 272 linked to the acquirer computing system 220 and an account 282 linked to the merchant 210. The accounts 272, 282 can each be maintained by financial institution 270 and financial institution 280, respectively, as schematically shown in FIG. 2. As indicated by the dashed lines on FIG. 2, settled funds can be routed from the card network(s) 240 to a pooled account 284 of the acquirer computing system 220. Various processing fees and charges can be transferred into the acquirer account 272. These fees can be based on the costs of the acquiring the transaction on behalf of the merchant 210 and, if a promotion or offer was applicable, additional fees can be levied by the acquirer computing system 220 and/or the promotion management computing system 250 based on the costs of the promotion management and redemption services. The remainder of the funds can be settled to the merchant account 282, or any other suitable account. The settlement process described above is sometimes referred to herein as a net settlement process.

Figure 3:
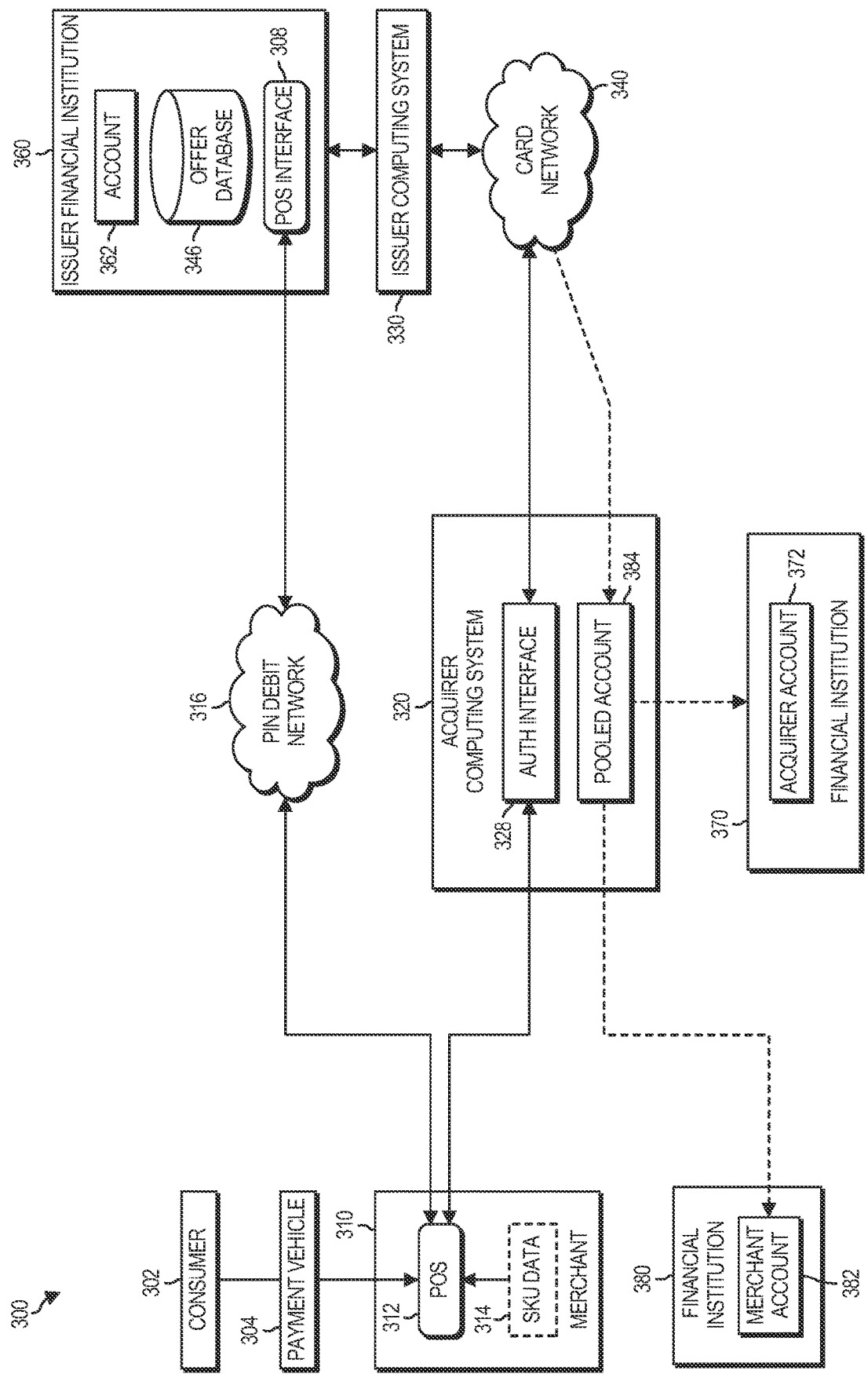
FIG. 3 is a simplified block diagram of another system for providing enhanced payment transaction functionality in accordance with various non-limiting embodiments.

Referring now to FIG. 3, in an embodiment, a system 300 for providing enhanced payment processing includes a merchant 310, a merchant point of sale (POS) device 312, an acquirer computing system 320, a PIN debit network 316, one or more payment card networks 340, an offer database 346, an issuer financial institution 360, an issuer computing system 330, a financial institution 370, and a financial institution 380. The system 300 can be embodied as an alternative arrangement to the enhanced payment systems 100, 200 illustratively shown in FIGS. 1 and 2. As such, the merchant 310, merchant POS device 312, acquirer computing system 320, PIN debit network 316, payment card network(s) 340, offer database 346, issuer financial institution 360, issuer computing system 330, financial institution 370, and financial institution 380 of the system 300 of FIG. 3 can be functionally or architecturally similar to, or the same as, in many respects to the merchant 110, 210, merchant POS device 112, 212, acquirer computing system 120, 220, PIN debit network 116, 216, payment card network(s) 140, 240, offer database 146, 246, issuer financial institution 160, 260, issuer computing system 230, financial institution 270, and financial institution 280 of the system 100 of FIG. 1 and/or the system 200 of FIG. 2. The acquirer computing system 320 can include an authentication interface 328 and a pooled account 384, which can be functionally or architecturally similar to, or the same as, in many respects to the authentication interlace 228 and pooled account 284 of the system 200 of FIG. 2. As illustratively shown in FIG. 3, the issuer financial institution 360 can include a POS interface 308, which can be functionally or architecturally similar to, or the same as, in many respects to the POS interface 208 of the system 200 of FIG. 2. Additionally, the consumer 302 and payment vehicle 304 illustratively shown in FIG. 3 can be substantially similar to, or the same as, the consumer 202 and payment vehicle 204 illustratively shown in FIG. 2 and described above.

In the illustrative embodiment, the offer database 346 is provided and managed by the issuer financial institution 360. As illustratively shown, the issuer financial institution 360 (or computing devices thereof) is in communication with the POS device 312 of the merchant 310 via the PIN debit network 316. Additionally, the issuer financial institution 360 (or computing devices thereof) is in communication with the acquirer computing system 320 via the card network(s) 340. In a manner similar to that discussed above with reference to FIG. 2, the POS device 312 is configured to transmit an offer identification query message including additional purchase event-specific information to the offer database 346 (or an associated computing device) over the PIN debit network 316. This transmission can occur prior to the POS device 312 submitting an authorization request message to the acquirer computing system 320.

Upon receipt of the offer identification query message, the offer database 346 (or the associated computing device) determines whether a matching offer exists. The offer database 346 transmits return offer messaging to the POS device 312 via the PIN debit network 316 based on determining whether a matching offer exists. The POS device 312 transmits a payment authorization request message to the acquirer computing system 320 based on the return offer messaging received from the offer database 346. The payment, authorization request message is transmitted by the acquirer computing system 320 to the issuer computing system 330 (or another computing device associated with the issuer financial institution 360) via the card network(s) 340 using conventional payment processing messaging. In response, the issuer computing system 330 (or another computing device associated with the issuer financial institution 360) transmits a payment authorization response message to the acquirer computing system 320 via the card network(s) 340 using conventional payment processing messaging. The payment authorization response message indicates whether the payment authorization request message is approved, denied, or assigned some other appropriate status. Similar to that which was discussed above in reference to system 200 of FIG. 2, subsequent to a successful payment transaction at the merchant 310, a settlement event can eventually occur that generally transfers funds from an account 362 that is linked to the payment vehicle 304 to at least an account 372 linked to the acquirer computing system 320 and an account 382 linked to the merchant 310.

Figure 4:
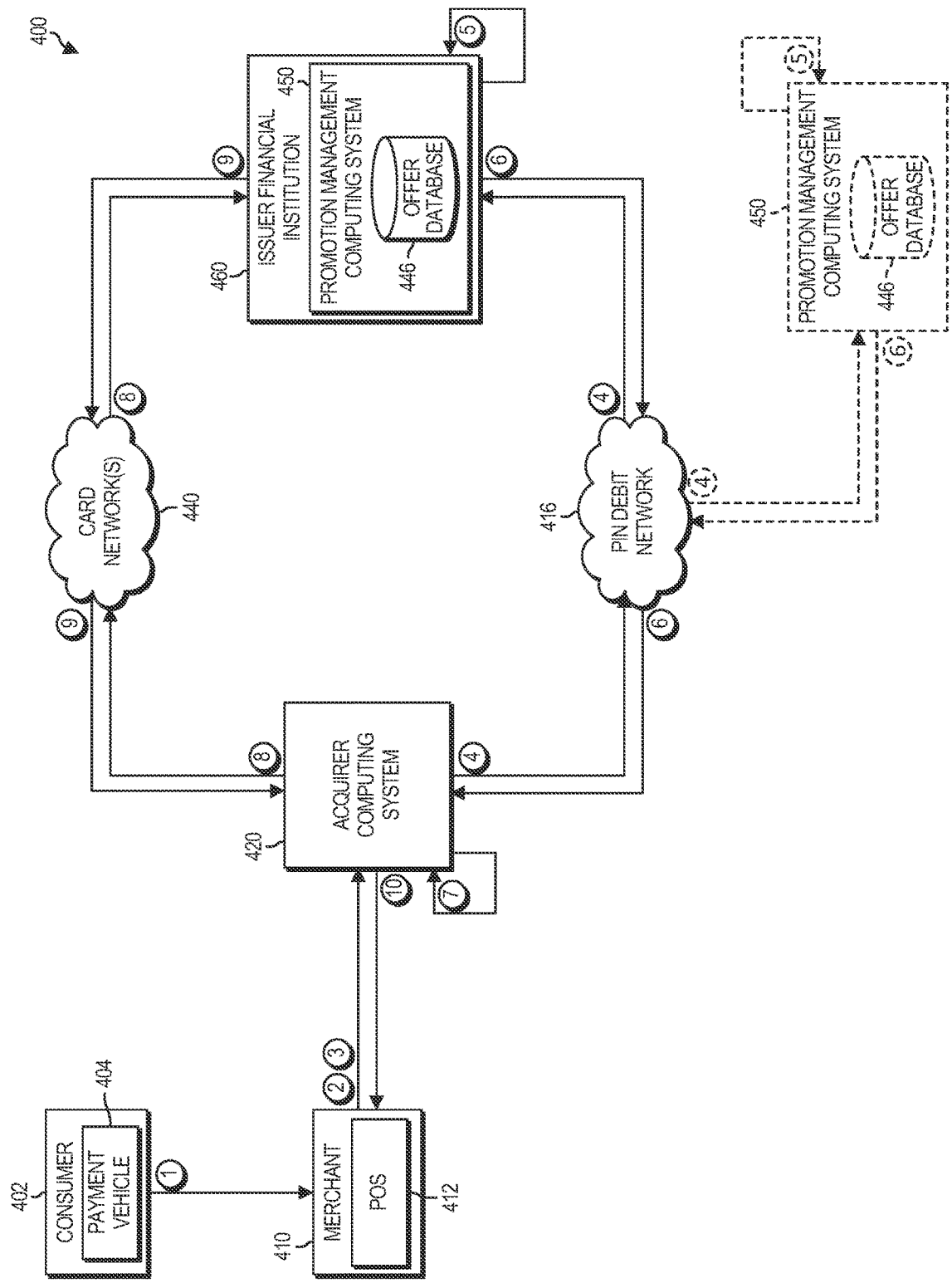
FIG. 4 is a simplified messaging and processing flow diagram of a system for providing enhanced payment transaction functionality in accordance with various non-limiting embodiments.

Referring now to FIG. 4, a simplified messaging and processing flow diagram of a system 400 for providing enhanced payment processing includes a merchant 410, a merchant point of sale (POS) device 412, an acquirer computing system 420, a PIN debit network 416, one or more payment card networks 410, an offer database 446, a promotion management computing system 450, and an issuer financial institution 460. The system 400 can be embodied as an alternative arrangement to the enhanced payment systems 100, 200, 300 illustratively shown in FIGS. 1-3. As such, the merchant 410, merchant point of sale (POS) device 412, acquirer computing system 420, PIN debit network 416, payment card network(s) 440, offer database 446, promotion management computing system 450, and issuer financial institution 460 of the system 400 of FIG. 4 can be functionally or architecturally similar to, or the same as, in many respects to, the merchant 110, 210, 310, merchant POS device 112, 212, 312, acquirer computing system 120, 220, 320, PIN debit network 116, 216, 316, payment card network(s) 140, 240, 340, offer database 146, 246, 346, promotion management computing system 250, 350, and issuer financial institution 160, 260, 360 of the system 100 of FIG. 1, the system 200 of FIG. 2, and/or the system 300 of FIG. 3. Additionally, the consumer 402 and payment vehicle 404 illustratively shown in FIG. 4 can be substantially similar to, or the same as, the consumer 202, 302 and payment vehicle 204, 304 illustratively shown in FIGS. 2-3 and described above. In embodiments such as the one illustratively shown in FIG. 4, the promotion management computing system 450 includes the offer database 446 and is provided by the issuer financial institution 460. Alternatively, in some embodiments, the promotion management computing system 450 can be provided by an entity separate from other entities of the system 400.

At flow 1, the POS device 412 of the merchant 410 receives a payment vehicle 404 tendered by a consumer 402 for purchase event. As discussed, the payment vehicle 404 can be embodied as a physical or virtual payment card. In response to receiving the payment vehicle 404, the POS device 412 can initiate a payment transaction for the purchase event.

At flow 2, the acquirer computing system 420 receives a payment authorization request message for the payment transaction from the POS device 412. The payment authorization request message includes a transaction amount that corresponds to the purchase event. The payment authorization request message can also include other types of data related to the payment transaction and/or the payment vehicle 404 tendered in connection with the payment transaction. At flow 3, in addition to the payment authorization request message, the acquirer computing system 420 receives purchase event-specific information from the POS device 412. The purchase event-specific information can include stock keeping unit (SKU) data associated with a purchased product or service, cardholder identification data associated with the payment vehicle 404 tendered in the payment transaction corresponding to the purchase event, an account identifier associated with the payment vehicle 404 tendered in the payment transaction corresponding to the purchase event, a bank identification number (BIN) associated with the payment vehicle 404 tendered in the payment transaction corresponding to the purchase event, or any other type of data describing or associated with the purchase event or associated payment transaction. It should be appreciated that although the acquirer computing system 420 is shown as receiving the payment authorization request message and the purchase event-specific information in separate messaging flows in the illustrative embodiment, the acquirer computing system 420 can instead receive both the payment authorization request message and the purchase event-specific information in the same messaging flow (e.g., within the same message), in other embodiments.

At flow 4, the acquirer computing system 420 transmits an offer identification query message to the promotion management computing system 450 via the PIN debit network 416. The offer identification query message can include the purchase event-specific information received from the POS device 412. At flow 5, in response to receiving the offer identification query message, the promotion management computing system 450 determines whether or not a matching offer exists. To do so, the promotion management computing system 450 can determine whether an offer stored or maintained by the offer database 446 matches the received offer identification query message and/or the purchase event-specific information included therein.

At flow 6, the promotion management computing system 450 transmits either offer redemption instructions or a notification message to the acquirer computing system 420 via the PIN debit network 416. For example, in response to determining that an offer matches the offer identification query message and/or the purchase event-specific information included therein, the promotion management computing system 450 transmits offer redemption instructions to the acquirer computing system 420 via the PIN debit network 416. As discussed below, the offer redemption instructions can be based on the terms of the matching offer and can cause the acquirer computing system 420 to augment and/or modify the payment authorization request message originally received from the POS device 412 prior to transmission of the request to the issuer financial institution 460 via the card network(s) 440. In some embodiments, the offer redemption instructions include a redemption value of the matching offer. The redemption value can be used by the acquirer computing system 420 to augment and/or modify the payment authorization request message originally received from the POS device 412. Alternatively, in response to determining that no offer matches the offer identification query message and/or the purchase event-specific information included therein, the promotion management computing system 450 transmits a notification message to the acquirer computing system 420 via the PIN debit network 416. As discussed below, the notification message can cause the acquirer computing system 420 to transmit the payment authorization request originally received from the POS device 412 to the issuer financial institution 460 via the card network(s) 440.

At flow 7, in response to receiving offer redemption instructions from the promotion management computing system 450, the acquirer computing system 420 determines a net transaction amount based at least in part on, or otherwise as a function of, the transaction amount that corresponds to the purchase event and the redemption value of the matching offer. For example, in some embodiments, the acquirer computing system 420 can reduce the original transaction amount of the purchase event by the redemption value of the matching offer to determine the net transaction amount. It should be appreciated that the acquirer computing system 420 can use any other technique to determine the net transaction amount based on the received offer redemption instructions. After determining the net transaction amount, the acquirer computing system 420 modifies or augments the original payment authorization request received from the POS device 412. To do so, the acquirer computing system 420 can substitute the original transaction amount (e.g., an undiscounted transaction amount) included in the payment authorization request with the determined net transaction amount. It should be appreciated that in embodiments in which the acquirer computing system 420 instead receives a notification message from the promotion management computing system 450, the acquirer computing system 420 does not modify or augment the original payment authorization request received from the POS device 412.

At flow 8, the acquirer computing system 420 transmits the original or modified payment authorization request message to the issuer financial institution 460 via the card network(s) 440. The issuer financial institution 460 is associated with the payment vehicle 404 tendered for the payment transaction. It should be appreciated that the card network (s) 440 are communication channels or paths separate and distinct from the communication channels or paths of the PIN debit network 416. As such, the PIN debit network 416 can be embodied as a communication channel out-of-band from the communication channels of the card network(s) 440. Additionally, as discussed, communications via the card network(s) 440 are limited to specific types of messages and content due to strict messaging specifications and protocols. In contrast, communications via the PIN debit network 416 are more flexible.

Subsequently, the issuer financial institution 460 (or computing devices associated therewith) processes the original or modified payment authorization request received from the acquirer computing system 420. At flow 9, the issuer financial institution 460 transmits a payment authorization response message to the acquirer computing system 420 via the card network(s) 440. The payment authorization response message is based on the original or modified payment authorization request and indicates whether the request is approved, denied, or assigned some other status. At flow 10, in some embodiments, the acquirer computing system 420 transmits or otherwise forwards the payment authorization response message to the POS device 412 for further processing (e.g., transaction finalization, accounting, receipt generation, etc.).

Figure 5:
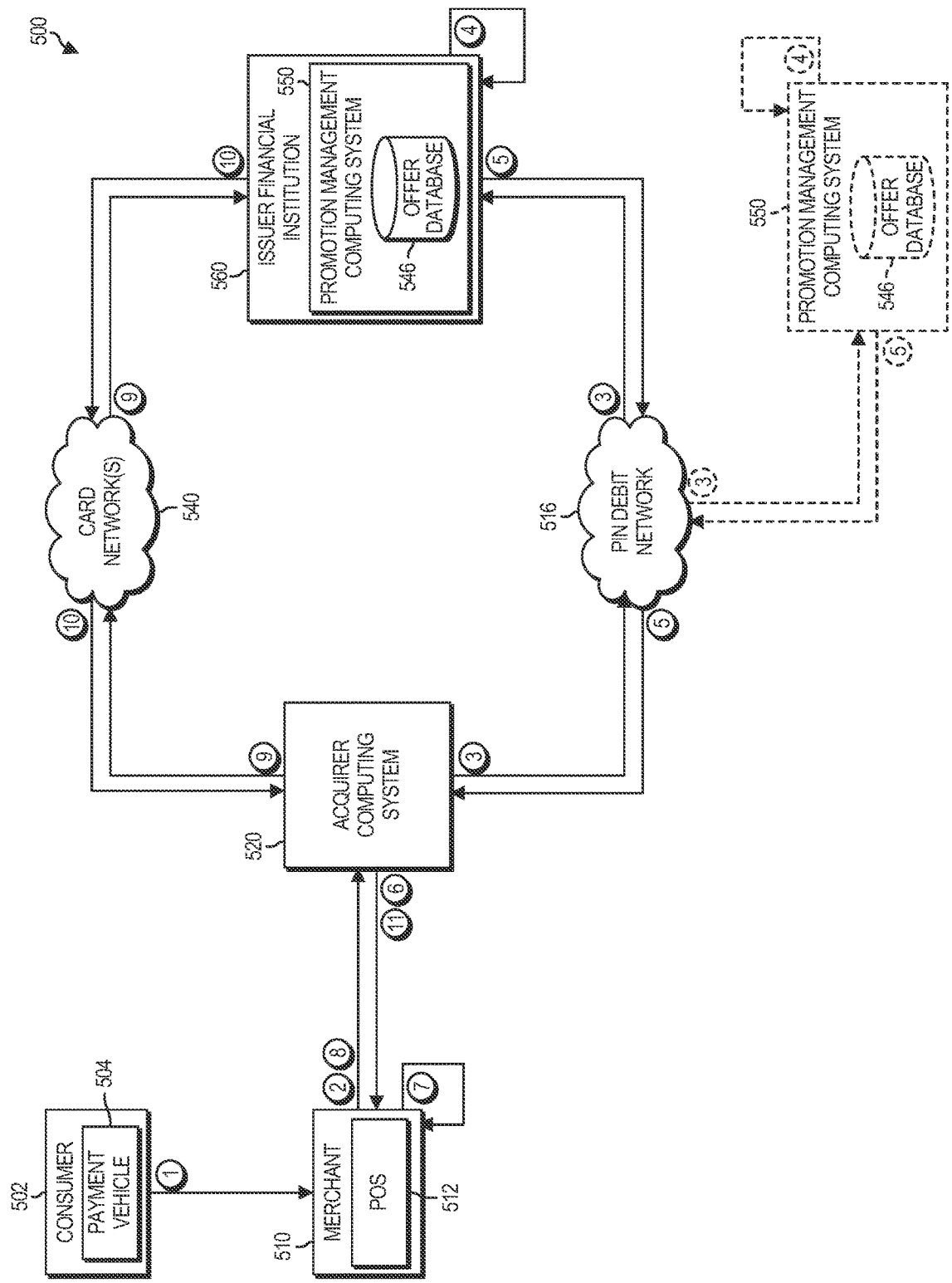
FIG. 5 is a simplified messaging and processing flow diagram of another system for providing enhanced payment transaction functionality in accordance with various non-limiting embodiments.

Referring now to FIG. 5, a simplified messaging and processing flow diagram of a system 500 for providing enhanced payment processing includes a merchant 510, a merchant, point of sale (POS) device 512, an acquirer computing system 520, a PIN debit network 516, one or more payment card networks 540, an offer database 546, a promotion management computing system 550, and an issuer financial institution 560. The system 500 can be embodied as an alternative arrangement to the enhanced payment systems 100, 200, 300, 400 illustratively shown in FIGS. 1-4. As such, the merchant 510, merchant POS device 512, acquirer computing system 520, PIN debit network 516, payment card network(s) 540, offer database 546, promotion management computing system 550, and issuer financial institution 560 of the system 500 of FIG. 5 can be functionally or architecturally similar to, or the same as, in many respects to, the merchant 110, 210, 310, 410, merchant POS device 112, 212, 312, 412, acquirer computing system 120, 220, 320, 420, PIN debit network 116, 216, 316, 416, payment card network(s) 140, 240, 340, 440, offer database 146, 246, 346, 446, promotion management computing system 250, 350, 450, and issuer financial institution 160, 260, 360, 460 of the system 100 of FIG. 1, the system 200 of FIG. 2, the system 300 of FIG. 3, and/or the system 400 of FIG. 4. Additionally, the consumer 502 and payment vehicle 504 illustratively shown in FIG. 5 can be substantially similar to, or the same as, the consumer 202, 302, 402 and payment vehicle 204, 304, 404 illustratively shown in FIGS. 2-4 and described above. As illustratively shown in FIG. 5, the promotion management computing system 550 includes the offer database 546 and is provided by the issuer financial institution 560. Alternatively, in some embodiments, the promotion management computing system 550 can be provided by an entity separate from other entities of the system 500.

At flow 1, the POS device 512 of the merchant 510 receives a payment vehicle 504 tendered by a consumer 502 for purchase event. As discussed, the payment vehicle 504 can be embodied as a physical or virtual payment card. In response to receiving the payment vehicle 504, the POS device 512 can initiate a payment transaction for the purchase event.

At flow 2, the POS device 512 transmits an offer identification query message to the acquirer computing system 520. The offer identification query message can include the purchase event-specific information received from the POS device 512. For example, the purchase event-specific information can include stock keeping unit (SKU) data associated with a purchased product or service, cardholder identification data associated with the payment vehicle 504 tendered in the payment transaction corresponding to the purchase event an account, identifier associated with the payment vehicle 504 tendered in the payment transaction corresponding to the purchase event, a bank identification number (BIN) associated with the payment vehicle 504 tendered in the payment transaction corresponding to the purchase event, or any other type of data describing or associated with the purchase event or associated payment transaction. At flow 3, in response to receiving the offer identification query message, the acquirer computing system 520 forwards or otherwise transmits the received offer identification query message to the promotion management computing system 550 via the PIN debit network 516. While FIG. 5 depicts the POS device 512 transmitting an offer identification query message to the acquirer computing system 520, in some embodiments, the POS device 512 can transmit the offer identification query message directly to the promotion management computing system 550 through the PIN debit network 516, as depicted above in FIGS. 2-3.

At flow 4, in response to receiving the offer identification query message, the promotion management computing system 550 determines whether or not a matching offer exists. To do so, the promotion management computing system 550 can determine whether an offer stored or maintained by the offer database 546 matches the received offer identification query message and/or the purchase event-specific information included therein. At flow 5, the promotion management computing system 550 transmits either offer redemption instructions or a notification message to the acquirer computing system 520 via the PIN debit network 516. For example, in response to determining that an offer matches the offer identification query message and/or the purchase event-specific information included therein, the promotion management computing system 550 transmits offer redemption instructions to the acquirer computing system 520 via the PIN debit network 516. In some embodiments, the offer redemption instructions include a redemption value of the matching offer. As discussed below, the redemption value can be used by the POS device 512 to determine a net transaction value to be included in a payment authorization request for the payment transaction. Alternatively, in response to determining that no offer matches the offer identification query message and/or the purchase event-specific information included therein, the promotion management computing system 550 transmits a notification message to the acquirer computing system 520 via the PIN debit network 516. As discussed below, the notification message can cause the POS device 512 to include the original transaction amount (e.g., undiscounted transaction amount) in the payment authorization request. At flow 6, in response to receiving the offer redemption instructions or the notification message, the acquirer computing system 520 forwards or otherwise transmits the received offer redemption instructions or notification message to the POS device 512 for further processing. For POS devices 512 having a direct connection to the promotion management computing system 550, as illustrated in FIGS. 2-3, the offer redemption instructions or the notification message can be transmitted by the promotion management computing system 550 directly to the POS device 512 through the PIN debit network 516.

At flow 7, in response to receiving offer redemption instructions from the acquirer computing system 520, the POS device 512 determines a net transaction amount based at least in part on, or otherwise as a function of, the transaction amount that corresponds to the purchase event and the redemption value of the matching offer. For example, in some embodiments, the POS device 512 can reduce the original transaction amount of the purchase event by the redemption value of the matching offer to determine the net transaction amount. It should be appreciated that the POS device 512 can use any other technique to determine the net transaction amount based on the received offer redemption instructions. After determining the net transaction amount, the POS device 512 can generate a payment authorization request message that includes the determined net transaction amount. It should be appreciated that in embodiments in which the POS device 512 instead receives a notification message from the acquirer computing system 520, the POS device 512 can instead generate a payment authorization request message that includes the original transaction amount (e.g., an undiscounted transaction amount) corresponding to the purchase event.

At flow 8, the POS device 512 transmits the payment authorization request message to the acquirer computing system 520. At flow 9, in response to receiving the payment authorization request message, the acquirer computing system 520 forwards or otherwise transmits the received payment authorization request message to the issuer financial institution 560 via the card network(s) 540. The issuer financial institution 560 is associated with the payment vehicle 504 tendered for the payment transaction. As discussed, it should be appreciated that the card network(s) 540 are communication channels or paths separate and distinct front the communication channels or paths of the PIN debit network 516.

Subsequently, the issuer financial institution 560 (or computing devices associated therewith) processes the payment authorization request received from the acquirer computing system 520. At flow 10, the issuer financial institution 560 transmits a payment authorization response message to the acquirer computing system 520 via the card network(s) 540. The payment authorization response message is based on the payment authorization request and indicates whether the request is approved, denied, or assigned some other status. At flow 11, in some embodiments, the acquirer computing system 520 transmits or otherwise forwards the payment authorization response message to the POS device 512 for further processing (e.g., transaction finalization, accounting, receipt generation, etc.).

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed herein should be taken as mandatory for any specific implementation of any of these the apparatuses, devices, systems or methods unless specifically designated as mandatory. In addition, elements illustrated in the figures are not necessarily drawn to scale for simplicity and clarity of illustration. For ease of reading and clarity, certain components, modules, or methods can be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and can be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead can be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures or characteristics can be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others, and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions can be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

The invention claimed is:

1. A method for enhancing payment transactions, the method comprising:
   transmitting, via a debit network by an acquirer computing system to a promotion management computing system, an offer identification query comprising event-specific data corresponding to a payment authorization request message;
   based on an offer that matches the transmitted offer identification query being stored in the promotion management computing system, receiving, via the debit network, offer redemption instructions;
   modifying the payment authorization request message based on the offer redemption instructions; and
   transmitting, via a second network, the modified payment authorization request message to an issuer financial institution.

2. The method of claim 1, wherein the debit network is a communications channel out-of-band from the second network.

3. The method of claim 1, wherein the second network uses one or more selected messaging specification(s) or protocols and the debit network uses messaging specification(s) or protocols other than, or in addition to, the selected messaging specification(s) or protocol.

4. The method of claim 1, wherein the event-specific data comprises at least one of a stock keeping unit associated with a purchased product or service, cardholder identification data associated with a payment vehicle tendered in the payment transaction, an account identifier associated with the payment vehicle tendered in the payment transaction, or a bank identification number associated with the payment vehicle tendered in the payment transaction.

5. The method of claim 1, wherein the offer redemption instructions include an offer expiration date and a redemption value.

6. The method of claim 1, further comprising:
determining, by the acquirer computing system, a net transaction amount associated with the payment authorization request message; and
modifying, by the acquirer computing system, the payment authorization request message based on the net transaction amount.

7. The method of claim 1, further comprising:
receiving, by the acquirer computing system via the second network, a payment authorization response message from the issuer computing system as a function of the modified payment authorization request message.

8. The method of claim 1, further comprising:
receiving, by the acquirer computing system via the second network, a payment authorization response message from the issuer computing system as a function of the modified payment authorization request message.

9. A system for enhanced payment transactions, the system comprising:
an acquirer computing system comprising a processor executing instructions stored in memory, wherein the instructions cause the processor to execute a method comprising:
transmitting, via a debit network from the acquirer computing system to a promotion management computing system, an offer identification query comprising event-specific data corresponding to a payment authorization request message;
based on an offer that matches the transmitted offer identification query being stored in the promotion management computing system, receiving, via the debit network, offer redemption instructions;
modifying the payment authorization request message based on the offer redemption instructions; and
transmitting, via a second network, the modified payment authorization request message to an issuer financial institution.

10. The system of claim 9, wherein the debit network is a communications channel out-of-band from the second network.

11. The system of claim 9, wherein the second network uses one or more selected messaging specification(s) or protocols and the debit network uses messaging specification(s) or protocols other than, or in addition to, the selected messaging specification(s) or protocol.

12. The system of claim 9, wherein the event-specific data comprises at least one of a stock keeping unit associated with a purchased product or service, cardholder identification data associated with a payment vehicle tendered in the payment transaction, an account identifier associated with the payment vehicle tendered in the payment transaction, or a bank identification number associated with the payment vehicle tendered in the payment transaction.

13. The system of claim 9, wherein the offer redemption instructions include an offer expiration date and a redemption value.

14. The system of claim 9, the method further comprising:
determining, by the acquirer computing system, a net transaction amount associated with the payment authorization request message; and
modifying, by the acquirer computing system, the payment authorization request message based on the net transaction amount.

15. The system of claim 9, the method further comprising:
receiving, by the acquirer computing system via the second network, a payment authorization response message from the issuer computing system as a function of the modified payment authorization request message.

16. A non-transitory machine-readable medium storing instructions that, when executed by a server, cause the server to perform a method for enhancing payment transactions, the method including:
transmitting, via a debit network by an acquirer computing system to a promotion management computing system, an offer identification query comprising event-specific data corresponding to a payment authorization request message;
based on an offer that matches the transmitted offer identification query being stored in the promotion management computing system, receiving, via the debit network, offer redemption instructions;
modifying the payment authorization request message based on the offer redemption instructions; and
transmitting, via a second network, the modified payment authorization request message to an issuer financial institution.

17. The non-transitory machine-readable medium of claim 16, wherein the debit network is a communications channel out-of-band from the second network.

18. The non-transitory machine-readable medium of claim 17, wherein the second network uses one or more selected messaging specification(s) or protocols and the debit network uses messaging specification(s) or protocols other than, or in addition to, the selected messaging specification(s) or protocol.

* * * * *